Figure 1:
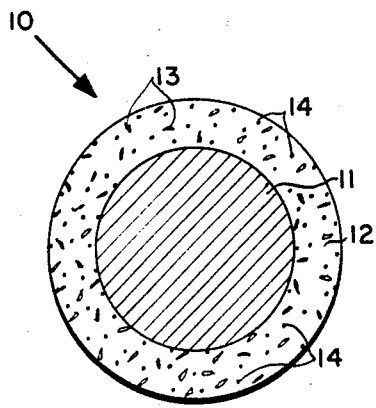

Sept. 26, 1967          H. L. SAUMS ETAL          3,343,984
       ELECTRICAL APPARATUS, INSULATING COMPOSITION THEREFOR
                  AND METHOD OF MAKING THE SAME
                        Filed July 6, 1962

INVENTORS
HARRY LEACH SAUMS
WESLEY W. PENDLETON
V. F. Volk
THEIR AGENT

# United States Patent Office 3,343,984
Patented Sept. 26, 1967

3,343,984
ELECTRICAL APPARATUS, INSULATING COMPOSITION THEREFOR AND METHOD OF MAKING THE SAME
Harry Leach Saums, North Muskegon, and Wesley W. Pendleton, Muskegon, Mich., assignors, by mesne assignments, to Anaconda Wire and Cable Company, a corporation of Delaware
Filed July 6, 1962, Ser. No. 207,882
9 Claims. (Cl. 117—218)

This application is a continuation-in-part of application Ser. No. 171,115 filed Feb. 14, 1962 now Patent No. 3,273,225 which is a continuation-in-part of application Ser. No. 763,187 filed Sept. 25, 1958, now abandoned.

Our invention relates to insulated electrical apparatus and particularly to such apparatus subjected to high temperatures, and to means for avoiding short-circuiting of such apparatus by carbon paths.

In the manufacture of electrical apparatus operable at very high temperature it has been suggested by the applicants of the present invention in an application Ser. No. 173,115 filed Feb. 14, 1962, now Patent No. 3,273,-255 to insulate magnet wire with glass-fiber windings which are covered with a baked magnet wire enamel. The enamel protects the glass during the coil-forming operation but after a coil has been formed the enamel is volatilized and burned off and, where desired, the glass is fused. Combinedly or alternatively, glass particles may be suspended in the enamel to be fused after the enamel has been removed by combustion.

If, instead of volatilizing or burning away completely, the organic matter in the enamel should be reduced to char or carbon it will form a conducting path that may short-circuit the turns of the coil. This may be particularly serious in view of the fact that after the glass has been fused the coil may be completely encapsulated so as to exclude oxygen which would otherwise assist in burning away any carbon traces.

We have discovered that the organic material can be completely burned off without leaving any conducting residues by including in the enamel certain oxidizing agents which, surprisingly, have been found to have no deleterious effects on the electrical quality of the insulation either before or after firing.

Our additives have also had the unexpected result of improving the adhesion of insulation to the wire.

We have invented an electrical conductor comprising at least one metallic conducting element, inorganic electrical insulation surrounding this element, combustible organic material in contact with the insulation, and inorganic oxygen-bearing particles in intimate contact with the organic material. These particles have the property of releasing oxygen at elevated temperature so that an increase in temperature sufficient to char the material will result in its combustion. Our conducting element may be a wire surrounded by inorganic insulation and an organic resin, with particles dispersed in the resin selected from the group consisting of the nitrates of aluminum, barium, calcium, cobalt, lead, lithium, magnesium, manganese (ous), potassium, sodium, and strontium; barium permanganate; and higher oxides of barium, cesium, cobalt, manganese, potassium, and sodium. Preferably the particles will reduce to glass-forming oxides upon the loss of released oxygen and we further prefer to use particles of lithium nitrate.

We have invented a wire coating composition comprising a magnet wire enamel, a solvent for the enamel with the enamel dissolved in the solvent, and 2.5–25% by weight on a solids basis of finely ground inorganic oxygen-bearing particles having the property of releasing oxygen at elevated temperatures, suspended in the solution. The released oxygen may be combined with nitrogen in the case of nitrate particles but dissociates upon contact with carbonaceous matter at high temperatures to oxidize the latter. In some embodiments of our invention our composition also comprises 15–50 parts by weight, on a solids basis, of finely divided glass suspended in the solution.

For the application of our novel composition we have invented the method of making an electrical apparatus comprising the steps of covering an electrical conductor with inorganic insulation, binding the insulation with a coating comprising solvent, combustible organic resin, and inorganic oxygen-bearing particles having the property of releasing oxygen at elevated temperature, and heating the insulation to evaporate the solvent and harden the resin. Our method includes the further steps of winding the insulated conductor into a coil and baking the coil above the decomposition point of the particles to burn off the organic matter. Preferredly our oxidizing particles decompose to leave a glass-forming oxide and the inorganic material is glass. Our method comprises the further step of baking the coil at a temperature above the fusion point of at least some of the glass present and fusing the oxides into the same.

A further understanding of our invention may be gained from a study of the appended drawing.

Figure 2:
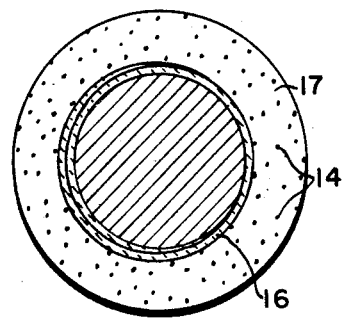
Figure 3:
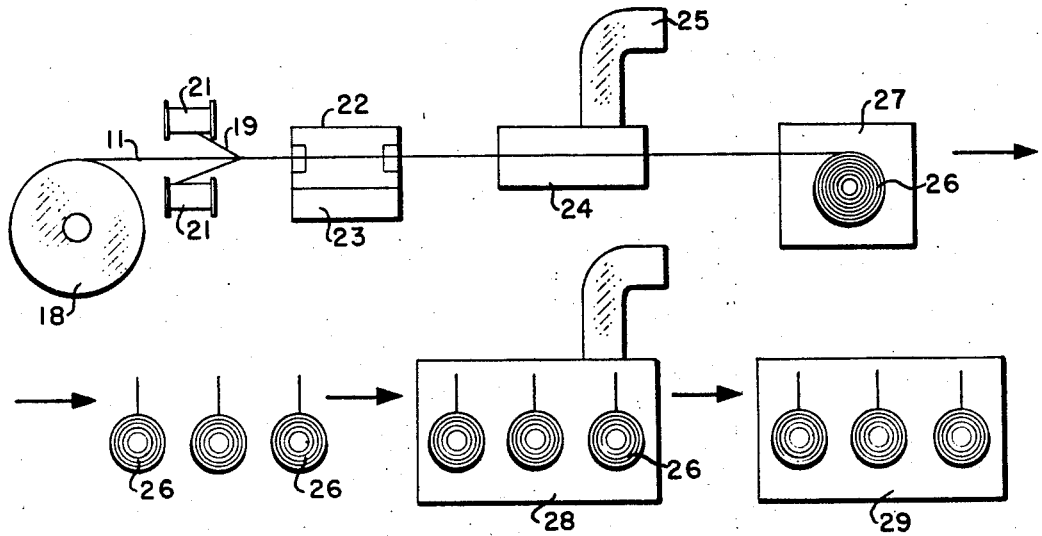

In the drawing:
FIGURE 1 is a cross section of a conductor of our invention.
FIGURE 2 is a cross section of another embodiment of the conductor of our invention.
FIGURE 3 is a schematic view of an embodiment of the method of our invention.

Referring to FIGURE 1 a magnet wire indicated generally by the numeral 10 has a conductor 11 conveniently made of copper or silver for service at high temperatures. The conductor 11 may be coated with an oxidation resisting plating or cladding such as nickel and is covered with a baked resin or enamel 12 wherein are dispersed fine particles 13 of glass and other fine particles 14 of oxygen-bearing materials such as lithium nitrate. The magnet wire 10 is intended for apparatus operable at very high temperatures such as temperatures in excess of 500° C. and after it has been formed into coils the glass particles will be fused to form an inorganic insulating wall. First, however, it is necessary to volatilize the enamel 12, and the oxygen-bearing particles 14 assure complete combustion of the enamel so that no carbon paths remain.

In FIGURE 2 the conductor 11 is covered with refractory material 16 which may be a brittle coating such as aluminum oxide or may be fusible glass such as a glass winding. In any case it is necessary to protect the coating 16 during storage and shipment of the wire and during the coil forming operation. For this purpose it is covered with an enamel 17 which, as is also true of the coating 12, is resistant to abrasion and flexure and which, preferably, also has good dielectric properties so that continuity of coating can be tested by electrical means. In order to assume complete combustion of the coating 17 oxygen-bearing particles are dispersed therein. As an example of resins suitable for forming the coatings 12 and 17 may be named: thermosetting polyester resin, silicone resins, blends of these two with each other and with polyvinyl formal. The above-named are by no means restrictive and other resins can also be used but in cases where the resins can be completely volatilized without oxidation there will be no need for the addition of the oxidizing particles which form an essential element of this invention. Completely fugitive enamels, however, do not have the physical and electrical properties required for high-speed coil forming. Furthermore when silicone enamel can be added to the blend the silica residue after combustion reinforces the inorganic insulation and is therefore desirable.

Example 1

A slurry was prepared from the following:

| | Lbs. |
|---|---|
| Finely powdered aluminum borosilicate glass | 2.8 |
| Lithium nitrate (well dispersed) | 1.0 |
| Polyester silicone resin and solvent (50% solids in xylene) | 14.0 |

The lithium nitrate of Example 1 was finely ground by ball milling. This has the dual purpose of holding the nitrate in suspension during application and storage and of forming an intimate contact between the particles and the material that must be oxidized. In addition to lithium nitrate we can use the nitrates of aluminum, barium, calcium, cobalt, lead, magnesium, manganese (ous), potassium, sodium and strontium. The oxidizing particles should not decompose at too low a temperature such as that required to bake the enamel, nor at a temperature so high that it is above the temperature required to start fusion of the glass. Within this range, in addition to the nitrates, fall barium permanganate, and higher oxides of barium, cesium, cobalt, manganese, potassium and sodium. $Cs_2O_2$ which loses oxygen at 650° C. is particularly useful although expensive and $Co_2O_2$ which decomposes at 895° C. can only be used with very high fusion glasses. In addition to assisting in the combustion of carbon residues, products of this type help to form an oxide layer on the conductor which favors good adhesion.

To form an apparatus of our invention the method of FIGURE 3 may be used. Here a spool 18 of the conductor 11 is wound with glass yarn 19 from bobbins 21 and passed into a wire enamelling apparatus 22 containing the slurry 23 of Example 1. Thence the conductor passes through an oven 24 where the solvent is volatilized up the stack 25 and the enamel baked to an abrasion resistant finish. Thereafter the coated conductor is formed into coils 26 on a coil-forming machine 27. The coils 26 are then passed into an oven 28 where the enamel is burned off and thence to a kiln 29 where the glass 19 is fused to the glass particles in the enamel. To form the conductor of FIGURE 1 the steps applying glass serving 19 may be omitted and where no fusion is required the kiln 29 may be omitted. We have found that the solution 28 should contain from 2.5–25% by weight, on a solids basis, of the oxygen-bearing particles (depending on the atomic weight percentage of oxide) suspended therein although we prefer to use from 5 to 15%. In Example 1 the glass content is 26.0% by weight, on a solids basis, but we have found that useful slurries may comprise from 15 to 50% depending on whether or not a separate insulation is applied to the conductor, and the wire size involved.

Lithium nitrate is preferred in our invention because the lithium oxide that remains after decomposition is a glass-forming oxide and blends into the glass fusion, combining also with any silica residue from silicone enamels. Other of the oxidizing particles that have glass-forming oxides such as $PbO$, $Na_2O$, $K_2O$, $Co_2O_3$ are also preferred. $CsO_2$ which melts at 600° C. and thereafter decomposes, $MnO_2$ which releases oxygen at 535° C., potassium peroxides and superoxides, and sodium peroxide are examples of oxygen bearing powders that may be advantageously used in the practice of our invention.

We have invented new and useful high temperature conductors and apparatus and methods for making the same for which we desire an award of Letters Patent.

We claim:

1. An insulated conductor comprising:
   - (A) an electrically conducting wire,
   - (B) inorganic insulation surrounding said wire,
   - (C) a combustible baked organic enamel covering said wire in contact with said insulation,
   - (D) inorgnaic oxygen-bearing particles dispersed in said enamel,
     - (a) said particles having the property of releasing oxygen at temperatures above the baking temperature of said enamel and below the fusion temperature of said inorganic insulation, thereby accomplishing the complete combustion of said enamel upon said wire being sufficiently heated.

2. An insulated conductor comprising:
   - (A) an electrically conducting wire,
   - (B) a combustible baked organic enamel covering said wire,
   - (C) fusible glass particles dispersed in said enamel,
   - (D) inorganic oxygen-bearing particles dispersed in said enamel,
     - (a) said oxygen-bearing particles having the property of releasing oxygen at temperatures above the baking temperature of said enamel and below the fusion temperature of said glass particles, thereby accomplishing the combustion of said enamel upon said wire being heated sufficiently to fuse said glass.

3. An insulated conductor comprising:
   - (A) an electrically conducting wire,
   - (B) inorganic insulation surrounding said wire,
   - (C) combustible baked organic enamel covering said wire in contact with said insulation,
   - (D) inorganic oxygen-bearing particles dispersed in said enamel,
     - (a) said particles being selected from the group consisting of: the nitrates of aluminum, barium, calcium, cobalt, lead, lithium, magnesium, manganese (ous), potassium, sodium, and strontium; barium permanganate; and higher oxides of barium, cesium, cobalt, manganese, potassium, and sodium,
     - (b) said particles being uncombined and having the property of releasing oxygen at temperatures above the baking temperature of said enamel.

4. An insulated conductor comprising:
   - (A) an electrically conducting wire,
   - (B) fusible glass insulation surrounding said wire,
   - (C) combustible baked organic enamel covering said wire,
   - (D) inorganic oxygen-bearing particles dispersed in said enamel,
     - (a) said particles having the property of releasing oxygen at elevated temperature above the baking temperature of said enamel,
     - (b) said particles reducing to glass-forming oxides upon the loss of said released oxygen.

5. An insulated conductor comprising:
   - (A) an electrically conducting wire,
   - (B) fusible glass insulation surrounding said wire,
   - (C) combustible organic enamel covering said wire in contact with said insulation,
   - (D) particles of lithium nitrate dispersed in said enamel.

6. A wire coating composition comprising:
   - (A) a bakable magnet wire enamel comprising an organic resin,
   - (B) a solvent for said enamel,
     - (a) said enamel being dissolved in said solvent to form a solution,
   - (C) 15–50% by weight on a solids basis of glass
     - (a) finely divided and suspended in said solution, and
   - (D) 2.5–25% by weight on a solids basis of inorganic oxygen-bearing particles
     - (a) finely ground in suspension in said solution, and
     - (b) having the property of releasing oxygen at elevated temperature above the baking temperature of said enamel.

7. A wire coating composition comprising:
   - (A) a magnet wire enamel comprising an organic resin,
   - (B) a solvent for said enamel, (a) said enamel being dissolved in said solvent to form a solution,
(C) 15–50% by weight on a solids basis of glass
   (a) finely divided and
   (b) suspended in said solution, and
(D) 2.5–25% by weight on a solids basis of inorganic oxygen-bearing particles
   (a) suspended in said solution and
   (b) selected from the group consisting of: the nitrates of aluminum, barium, calcium, cobalt, lead, lithium, magnesium, manganese (ous), potassium, sodium, and strontium; barium permanganate; and the higher oxides of barium, cesium, cobalt, manganese, potassium and sodium.

8. A wire coating composition comprising:
(A) a magnet wire enamel comprising an organic resin,
(B) a solvent for said enamel,
   (a) said enamel being dissolved in said solvent to form a solution,
(C) 15–50% by weight on a solids basis of glass
   (a) finely divided and
   (b) suspended in said solvent, and
(D) 2.5–25% by weight on a solids basis of inorganic oxygen-bearing particles
   (a) finely ground
   (b) suspended in said solution,
   (c) having the property of releasing oxygen at elevated temperature, and
   (d) reducing to glass-forming oxides upon the loss of said released oxygen.

9. A wire coating composition comprising:
(A) a magnet wire enamel comprising an organic resin,
(B) a solvent for said enamel,
   (a) said enamel being dissolved in said solvent to form a solution,
(C) 15–50% by weight on a solids basis of glass
   (a) finely divided and
   (b) suspended in said solution, and
(D) 2.5–25% by weight on a solids basis of lithium nitrate
   (a) finely divided and
   (b) suspended in said solution.

References Cited

UNITED STATES PATENTS

| | | | |
|---|---|---|---|
| 949,010 | 2/1910 | Von Unruh | 117—33.4 |
| 2,033,103 | 3/1936 | Beyersdorfer | 106—49 |
| 2,104,609 | 1/1938 | Leeuw | 106—41 X |
| 2,245,541 | 6/1941 | Goodwin | 106—49 |
| 2,564,978 | 8/1951 | Hyde et al. | 106—41 |
| 2,668,783 | 2/1954 | Migley | 106—48 |
| 2,739,371 | 3/1956 | Grisdale et al. | 29—155.57 |
| 2,848,794 | 8/1958 | Roth | 29—155.57 |
| 2,879,185 | 3/1959 | King et al. | 106—49 X |
| 2,911,312 | 11/1959 | Hoffman | 106—48 |
| 3,030,257 | 3/1962 | Wheasley et al. | 117—232 X |
| 3,035,115 | 5/1962 | Heckel | 174—110 |
| 3,059,046 | 10/1962 | Westervelt et al. | 174—110 |
| 3,089,787 | 5/1963 | Suttler et al. | 117—231 X |
| 3,175,937 | 3/1965 | Bayer et al. | 156—89 |

ALFRED L. LEAVITT, *Primary Examiner.*

JOHN P. WILDMAN, RICHARD D. NEVIUS,
*Examiners.*

W. F. ZAGURSKI, A. GOLIAN, *Assistant Examiners.*